Nov. 27, 1923.

C. W. INGELS 1,475,232

APPARATUS FOR MEASURING INTERVALS OF TIME

Filed Jan. 30, 1922

Inventor.
C. W. Ingels

Patented Nov. 27, 1923.

1,475,232

UNITED STATES PATENT OFFICE.

CLARENCE W. INGELS, OF WASHINGTON, DISTRICT OF COLUMBIA.

APPARATUS FOR MEASURING INTERVALS OF TIME.

Application filed January 30, 1922. Serial No. 532,841.

*To all whom it may concern:*

Be it known that I, CLARENCE W. INGELS, a citizen of the United States, and a resident of the city of Washington, District of Columbia, have invented new and useful Improvements in Apparatus for Measuring Intervals of Time, of which the following is a specification.

This invention relates to method of and apparatus for measuring short intervals of time, such as the time of operation of relays and switches, by means of a calibrated inductive coil and has for one of its objects the provision of a simple sturdy device that will measure intervals of time to within as small a fraction as the one-thousandth part of a second. A further object is to provide convenient means for the measurement of such short intervals of time which can be used with accuracy by those unskilled in the use of testing devices generally.

The theory of operation by my invention is based on the fact that current at a given voltage entering an inductive coil requires a definite interval of time to build up from zero to its final value. This interval is dependent on the several factors entering into the design of the coil (e. g. number of turns, size of core etc.), which factors may be chosen or corelated to produce a coil that will, with regard to this time characteristic, be best suited for the particular type of apparatus to be tested. During the interval or period of building up, it has also been found that the current values change with time in accordance with the equation $$t = -\frac{L}{R} \log_e \left(1 - \frac{Ri}{E}\right)$$

where $t$ is the elapsed time in seconds from the time the circuit was closed; R the resistance of the coil in ohms; $e$ the base of the Naperian logarithm system; and $i$ the instantaneous value of the current. Hence in a given coil, it follows that the current value at any instant is directly proportional to the time that it has been flowing in the coil. Since the magnetic flux produced in the core of the coil is directly proportional to the current value flowing in its winding, the flux so produced will increase in value as the current value increases and will in all cases reach its maximum value or density at the instant the flow of current in the coil is interrupted. Therefore, by measuring this maximum value of flux, a convenient means is afforded for determining the duration of the current producing it. This may be conveniently done by adjustably supporting a movable armature in proximity to one pole of the core of the coil in such a manner that the armature will be attracted to the core at the instant of maximum flux, and immediately released as the flux value decreases from its maximum, thus indicating the interruption of the current flowing in the coil. The distance of the armature from the core will, therefore, obviously be a measure of the maximum flux produced by a current of limited duration, and a reading of such distance (air gap) may be translated into terms of time or duration of current flow in the coil. I have provided suitable means for measuring the air gap corresponding to currents of different duration, and also means for expressing this factor in terms of time, which will now be described in detail, in connection with the accompanying drawing, but it is not my intention to be limited to this specific showing which is merely illustrative, and in which:

Figure 1:
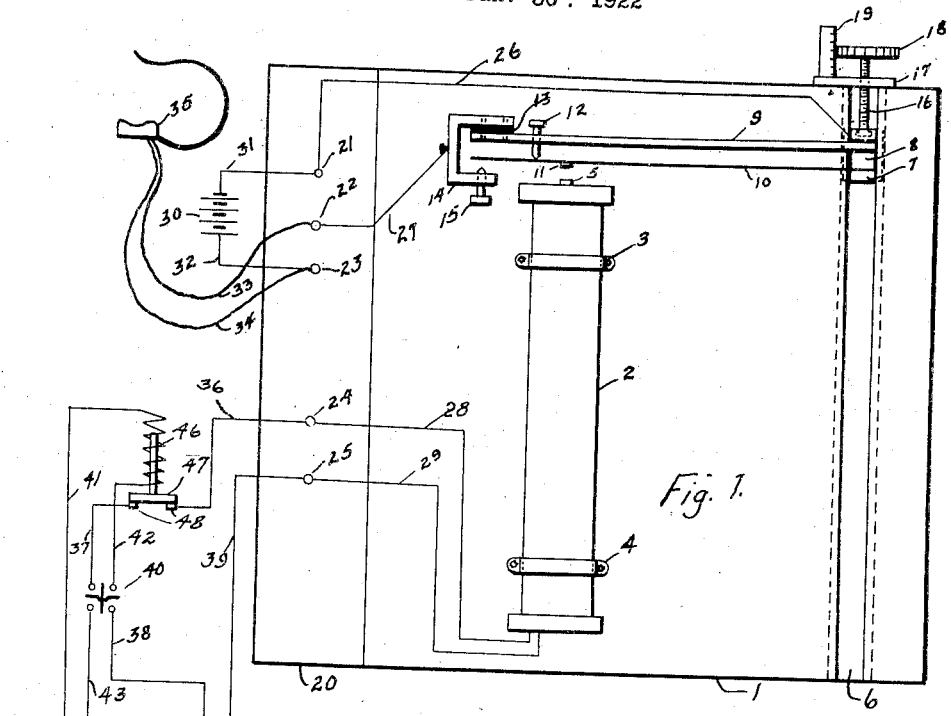
Figure 1 is a plan view of a preferred form of my measuring device showing its relationship to the several operating circuits, including that of an electro-magnetic relay, the time of operation of which it is desired to measure.

In Fig. 1, 1 is a base plate of either wood or metal, on which is solidly mounted an inductive coil 2 by means of the straps 3 and 4. An iron core extends throughout the length of the inductive coil 2 and is shown protruding at 5 beyond the end of the coil. In the right half of the base plate 1 is cut a dove-tail slot 6 which extends throughout the length of the base plate. A dove-tailed block 7 slides snugly in the slot 6 and carries a pillar 8 extending upwardly from the base plate 1. On one side of the pillar 8 is attached a rigid arm 9, preferably on non-ferrous metal, and on the other side of the pillar 8 is attached a leaf spring 10. The arm 9 and spring 10 are made of conducting material and are electrically continuous through the metal pillar 8. They are supported at 8 only and are held parallel to the base plate 1, at a distance equal to the height of the core 5 above the base plate. The spring 10 carries an iron armature 11, approximately opposite the core 5. A knurled headed-screw 12 extends through the arm 9 and bears against the spring 10. A bent bar 14 is attached to the end of bar 9 and is insulated therefrom by means of the insulation 13. Through the free end of this bar 14 extends a screw 15, against the point of which the free end of the spring 10 will strike when the spring is sufficiently deflected.

A fine pitched screw 16 extends through and in threaded engagement with a plate 17, which plate is secured to the base plate 1, and covers the slot 6 at one end. The inner end of the screw 16 is journalled in the block 7 by means of a swivel joint, the other end of the screw 16 carrying a hand-wheel 18 rigidly attached. Rotation of the hand-wheel 18 causes the block 7 to slide along the dove-tail slot 6. A scale 19 is attached to the base plate 1 and is mounted adjacent to the hand-wheel 18. The perimeter of the hand-wheel 18 is divided into equal graduations and the scale 19 is graduated into divisions representing complete revolutions of the hand-wheel.

A non-conducting terminal board 20 is mounted at the side of the base plate 1, and contains the binding posts, 21, 22, 23, 24, and 25. Binding post 21 is connected to the arm 9 by the insulated conductor 26 and is also connected to one pole of a battery 30 by means of conductor 31. The opposite pole of the battery 30 is connected to the binding post 23 by means of conductor 32. Binding post 22 is connected to the bent arm 14 by means of the insulated flexible conductor 27. Two flexible insulated conductors 33 and 34 connect the receiver 35 of a telephone head set to the two binding posts 22 and 23.

Binding posts 24 and 25 are connected to the terminals of the inductive coil 2 by means of the insulated conductors 28 and 29. An insulated conductor 36 leads from binding post 24 through the contacts 48 and armature 47 of a relay 46, to a conductor 37 which is connected to one terminal of a snap switch 40. The diametrically opposite terminal of the snap switch is connected to one terminal of a two pole switch 45 by means of conductor 38. The other terminal of the switch 45 is connected to the binding post 25 by means of an insulated conductor 39. Conductors 49 and 50 are connected to the switch 45 and furnish a constant voltage supply for operating the coil 2. The relay 46, the time of operation of which it is desired to measure, is connected by conductor 41 to one pole of a two pole switch 44 and to the other pole of the same switch by means of conductors 42 and 43 through the snap switch 40. Conductors 51 and 52 are connected to the switch 44 and furnish the proper voltage for operating the relay. Switch 40 is a rotary two-way snap switch, shown in the open position. The two blades shown diagrammatically are insulated from each other and when the switch is in the closed position, terminals that are diametrically opposite are connected together. In this arrangement of wiring the snap switch 40 must be precisely adjusted in order that all contacts will close simultaneously upon operation.

The operation of the device is as follows:

A constant voltage supply, for which the inductive coil 2 is designed, is connected to the switch 45. A relay 46, whose time of operation it is desired to measure, is connected through switch 44 to supply lines 51, 52 the voltage of which is the same or approximately that on which the relay is intended to operate. The contacts at 48 are closed as long as the relay is not energized. With switches 44 and 45 closed, the snap switch 40 is closed. The inductive coil 2 is at once energized from switch 45 through conductors 38, 37, contacts 48, conductors 36, 28 from one pole of switch, and through conductors 39 and 29 from other pole of switch. At the same time the coil of relay 46 is energized from switch 44 through conductor 41 and conductors 42 and 43 in series. Current continues to flow in coil 2 until the circuit is broken by the relay lifting its armature 47 and disrupting the circuit at contacts 48. Coil 2 is so designed with respect to the apparatus which it is intended to test that, the magnetic flux in the coil will not have reached the saturation point during the time the coil is energized. That is, the coil is always operated below the knee of the curve plotted between current or magnetic flux and time.

When the magnetic flux in the core 5 of the inductive coil has attained a value sufficiently high, the armature 11 may be attracted and moved against the force of the leaf spring 10. If the spring is sufficiently deflected, its free end will make contact with the point of the screw 15 and an indication of this contact will be given by a click or distinctive sound in the telephone receiver 35, which is placed at the ear of the operator. The circuit for energizing the receiver is from one pole of the battery 30 through conductor 31, binding post 21, conductor 26, supporting pillar 8, spring 10, contact screw 15, bar 14, flexible conductor 27, binding post 22, flexible conductor 33, receiver 35, flexible conductor 34, binding post 23, conductor 32 to opposite pole of battery 30. By turning the handwheel 18, the air gap between the armature 11 and the core 5 may be adjusted.

The operator with the telephone receiver to his ear turns switch 40 to the closed position and listens for a click in the receiver. As soon as the relay operates, he turns the snap switch 40 to the off position. If during the operation of relay, no click is heard in the receiver, the hand-wheel 18 is turned in the direction to shorten the air gap between the core 5 and armature 11 and the testing operation is repeated. When the air gap has been so adjusted that a single click is audible each time the snap switch 40 is closed, the measurement is completed. A reading of the scales on 19 and 18 will give the number of turns and fractions of turns from a certain chosen origin indicating the adjustment necessary for the particular test, and by reference to the calibration curve of Fig. 2, the time in seconds required for the relay to operate may be obtained. Where a large number of relays are being tested and adjusted to operate at a certain definite time, a mark or indication may be made on the scales 19 and 18 and the relays adjusted until the operator gets the proper indications when the hand-wheel is set at the marked points. This makes unnecessary any reference to the calibration curve. The graduations on scales 19 and 18 may also be calibrated to read time directly.

Figure 2:
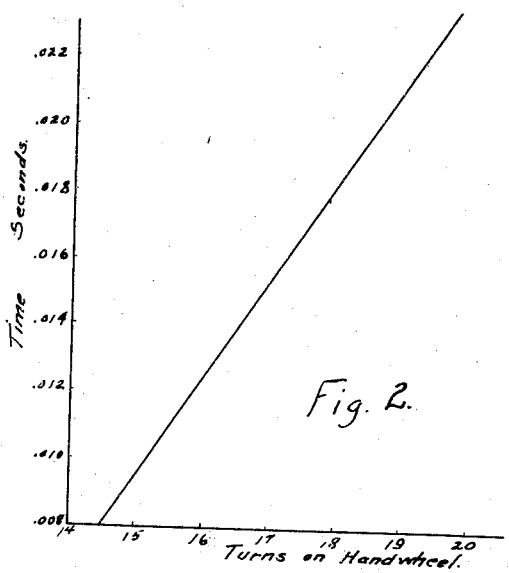
Figure 2 is a calibration curve for the instrument shown in Figure 1.

In calibrating the inductive coil 2, a contact-making device that will accurately repeat itself, in giving contacts of equal duration is necessary. With certain setting on the contact-making device, the coil 2 is connected in the circuit and the air gap adjusted until a click is obtained in the receiver uniformly for each operation. The scales 18 and 19 are then read and recorded. Coil 2 is then disconnected and the contact-making device is connected to some time measuring device, such as an oscillograph. The values of the hand-wheel settings are then plotted against the corresponding times of contact, as obtained from the oscillograph record, and a calibration curve similar to that in Fig. 2 is obtained.

While I have chosen to represent my invention by a device in which the air gap is varied, I do not intend to be limited to this device alone, as equivalent results may be obtained by varying other characteristics of an inductive coil and armature. For example, with a constant air gap, the number of turns on the coil could be varied, and a calibration curve obtained between the time of operation and the number of active turns. Such a calibrated coil could be used in similar manner to the one described. Again, the reluctance of the core could be varied by changing the position of the core or the amount of iron therein, other characteristics being constant, and a calibration curve obtained and used in a similar manner. With all physical characteristics kept constant, the voltage supplied could be varied and the coil calibrated in terms of voltage and time, and used to measure time intervals.

What I claim as new and desire to secure by Letters Patent is:

1. In a device for measuring the duration of an interval of time comprising a calibrated induction coil with movable armature and means for energizing said coil during the interval of time to be measured, means for varying one calibration factor of the coil to effect a definite movement of the armature, and means for registering the extent of variation of the calibration factor.

2. A time measuring device comprising, a self induction coil, means for closing and opening the circuit of said coil, and means for measuring a force depending upon the value of the magnetic flux traversing said coil at the instant the circuit is opened.

3. A time measuring device comprising, a self induction coil, means for maintaining current flow in the coil during the interval of time to be measured, and means for measuring a force depending upon the value of the magnetic flux established by the coil when the current flow is interrupted.

4. A time measuring device comprising, a self induction coil, means for closing the circuit of the coil at the beginning of the time to be measured, means for opening said circuit at the end of said period of time, and means for measuring a force corresponding to the maximum value of the magnetic flux established by the coil during said period of time.

5. A time measuring device comprising, a self induction coil, means for closing the circuit of the coil at the beginning of the time to be measured, means for opening said circuit at the end of said period of time, an adjustably disposed armature cooperating with said coil, and an indicating circuit controlled by said armature.

6. A time measuring device comprising, a self induction coil, means for maintaining current flow in the coil during the interval of time to be measured and interrupting said flow at the end of said interval, an armature cooperating with said coil and adjustably disposed with respect thereto, an auxiliary circuit controlled by said armature, and means included in said auxiliary circuit for indicating the condition thereof.

7. A time measuring device comprising a self induction coil, an armature cooperating therewith and adjustably disposed with respect thereto, an auxiliary circuit controlled by said armature, and a telephone receiver included in the auxiliary circuit for indicating the condition thereof.

8. A device for measuring the timing of electrical contacts, comprising a self induction coil the circuit of which is controlled by the contacts to be timed, an armature cooperating with the coil, an auxiliary circuit controlled by the armature, indicating means in said auxiliary circuit responsive to changes therein, and a micrometer adjustment for changing the air gap between armature and core.

9. A time measuring device comprising, an electro-magnet having a core and movable armature, means for closing and opening the circuit of said magnet, means for varying the air gap between said core and armature, and means for measuring the air gap at the instant the circuit is opened.

10. A time measuring device comprising, a self induction coil having a core, an armature cooperating therewith and adjustable with respect thereto, means for maintaining the circuit of said coil closed during the interval of time to be measured, an auxiliary circuit controlled by said armature, means included in said auxiliary circuit for indicating the condition thereof, and means for measuring the air gap between the core and armature at the instant the said first-named circuit is opened.

11. A device for measuring the timing of electrical contacts, comprising an induction coil having a core, a movable armature cooperating therewith, means for opening and closing the circuit of said coil synchronously with the movement of contacts to be timed, an auxiliary circuit controlled by said armature and means included in said auxiliary circuit for indicating the condition thereof, a base element for supporting said coil provided with a groove in one face thereof, a slide fitted in said groove with an armature carrying arm supported thereon, and means for displacing said slide measured distances to vary the air gap between the armature and the core of the induction coil.

In testimony whereof, I have signed my name to this specification.

CLARENCE W. INGELS.